United States Patent
Kimura (10) Patent No.: US 11,488,279 B2
(45) Date of Patent: Nov. 1, 2022

(54) IMAGE PROCESSING APPARATUS, IMAGE PROCESSING SYSTEM, IMAGING APPARATUS, IMAGE PROCESSING METHOD, AND STORAGE MEDIUM

(71) Applicant: CANON KABUSHIKI KAISHA, Tokyo (JP)

(72) Inventor: Yoshinori Kimura, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 253 days.

(21) Appl. No.: 16/688,150

(22) Filed: Nov. 19, 2019

(65) Prior Publication Data
US 2020/0167885 A1    May 28, 2020

(30) Foreign Application Priority Data
Nov. 26, 2018   (JP) .............................. JP2018-219876

(51) Int. Cl.
| G06T 1/00 | (2006.01) |
| G06T 1/60 | (2006.01) |
| G06T 7/00 | (2017.01) |
| G06T 1/20 | (2006.01) |

(52) U.S. Cl.
CPC .............. *G06T 1/0007* (2013.01); *G06T 1/20* (2013.01); *G06T 1/60* (2013.01); *G06T 7/0002* (2013.01); *G06T 2207/20084* (2013.01)

(58) Field of Classification Search
None
See application file for complete search history.

(56) References Cited

U.S. PATENT DOCUMENTS

| 2012/0288212 A1* | 11/2012 | Arrasmith | G06T 5/003 382/260 |
| 2013/0279759 A1* | 10/2013 | Kagarlitsky | G06V 10/751 382/105 |
| 2015/0332443 A1* | 11/2015 | Yamada | G06T 5/50 382/274 |
| 2018/0157899 A1* | 6/2018 | Xu | G06N 3/0454 |
| 2018/0262291 A1* | 9/2018 | Doster | H04B 10/50 |

OTHER PUBLICATIONS

Lohani et al ("Turbulence correction with artificial neural networks", Optics Letters, vol. 43, Issue 11, Apr. 30, 2018, pp. 2611-2614, https://doi.org/10.1364/OL.43.002611) (Year: 2018).*
Zamek et al ("Turbulence strength estimation from an arbitrary set of atmospherically degraded images", Journal of the Optical Society of America A, vol. 23, Issue 12, Dec. 2006, pp. 3106-3113, https://doi.org/10.1364/JOSAA.23.003106) (Year: 2006 ).*

(Continued)

*Primary Examiner* — Leon Viet Q Nguyen
(74) *Attorney, Agent, or Firm* — Rossi, Kimms & McDowell LLP (57) ABSTRACT

An image processing apparatus includes an image acquisition unit configured to acquire a plurality of temporally different images each of which has degraded by a turbulence, a parameter acquisition unit configured to acquire a learned network parameter, and a measurement unit configured to measure a turbulence strength from the plurality of images using the network parameter and a neural network.

17 Claims, 7 Drawing Sheets

(56) References Cited

OTHER PUBLICATIONS

Zhu "Removing Atmospheric Turbulence via Space-Invariant Deconvolution" IEEE Transactions on Pattern Analysis and Machine Intelligence. 2013. vol. 35, No. 1. pp. 157-170. Cited in the specification.
Mao "Image Restoration Using Convolutional Auto-encoders with Symmetric Skip Connections," arXiv:1606.08921.2016, pp. 1-17. Cited in the specification.
Glorot "Understanding the difficulty of training deep feedforward neural networks," Proceedings of the 13th International Conference on Artificial Intelligence and Statistics, 2010: 249-256. Cited in the specification.

* cited by examiner

IMAGE ACQUISITION UNIT 101
PARAMETER ACQUISITION UNIT 102
MEASUREMENT UNIT 103
CORRECTION UNIT 104

| TURBULENCE STRENGTH OF (INPUT) IMAGE DEGRADED BY TURBULENCE | TURBULENCE STRENGTH OF (OUTPUT) IMAGE IN WHICH TURBULENCE IS CORRECTED |
|---|---|
| 1.4301 | 0.9399 |

FIG. 10

IMAGE PROCESSING APPARATUS, IMAGE PROCESSING SYSTEM, IMAGING APPARATUS, IMAGE PROCESSING METHOD, AND STORAGE MEDIUM

BACKGROUND OF THE INVENTION

Field of the Invention

The present invention relates to an image processing apparatus that can measure a turbulence strength with high accuracy using a convolutional neural network ("CNN").

Description of the Related Art

One conventional method recovers an image degradation caused by the turbulence of a medium between a camera and an object (e.g. atmospheric turbulence). Xiang Zhu, Peyman Milanfar, "Removing atmospheric turbulence via space-invariant deconvolution," IEEE Transactions on Pattern Analysis and Machine Intelligence, vol. 35, no. 1, 2013, pp. 157-170 (Zhu et al.) discloses a method for correcting a positional shift for each frame of a video caused by the turbulence, for correcting a varying blur depends on frame (time) and/or location, then for removing the blur through a blind deconvolution, and for recovering an image degradation caused by the turbulence.

The method disclosed in Zhu et al. can remove image degradation by the atmospheric turbulence, but cannot measure the strength of the atmospheric turbulence, which is the image degradation degree caused by the atmospheric turbulence. Estimating the deformation vector of the non-rigid registration from the atmospheric turbulence degraded video can be considered to be a metric of the turbulence strength, but the deformation vector cannot be estimated with high accuracy because the positional shift correction is difficult when the video has a moving object.

SUMMARY OF THE INVENTION

The present invention provides an image processing apparatus, an image processing system, an imaging apparatus, an image processing method, and a storage medium, each of which can measure a turbulence strength with high accuracy.

An image processing apparatus according to one aspect of the present invention includes an image acquisition unit configured to acquire a plurality of temporally different images each of which has degraded by a turbulence, a parameter acquisition unit configured to acquire a learned network parameter, and a measurement unit configured to measure a turbulence strength from the plurality of images using the network parameter and a neural network.

An image processing system according to another aspect of the present invention includes a client device, and a server device connected to the client device via a network. The client device includes an image output unit configured to output to the server device a plurality of temporally different images degraded by a turbulence. The server device includes a parameter acquisition unit configured to acquire a learned network parameter, a measurement unit configured to measure a turbulence strength from the plurality of images using the network parameter and a neural network, and a turbulence strength output unit for outputting the turbulence strength to the client device.

An imaging apparatus according to another aspect of the present invention includes an image sensor, and the above image processing apparatus.

An image processing method according to another aspect of the present invention includes an image acquisition step configured to acquire a plurality of temporally different images each of which has degraded by a turbulence, a parameter acquisition step configured to acquire a learned network parameter, and a measurement step configured to measure a turbulence strength from the plurality of images using the network parameter and a neural network. A non-transitory computer-readable storage medium storing a program for causing a computer to execute the above image processing method also constitutes another aspect of the present invention.

Further features of the present invention will become apparent from the following description of exemplary embodiments with reference to the attached drawings.

DESCRIPTION OF THE EMBODIMENTS

Referring now to the accompanying drawings, a detailed description of embodiments according to the present invention will be given.

A description of a turbulence will be given below. A captured image is degraded by the turbulence of a medium between the imaging apparatus and the object. For example, in capturing an image under the flaming sun or in capturing a distant object, the captured image deteriorates due to the atmospheric fluctuation (turbulence). For example, when an object at the bottom of the water is captured above the water, the captured image is degraded due to the fluctuation (turbulence) of the water.

The degradation of the captured image caused by the medium turbulence varies because the refractive index of the medium depends on the location and time. Hence, the generally obtained captured image has the different degradation degree at different locations. This is because the thickness, the temperature distribution, the flow, and the like of the medium between the imaging apparatus and the object vary from place to place, and as a result, the refractive index of the medium varies from place to place. For the similar reason, the degradation degree of the captured image varies with time.

The positional shift correction (registration) of each frame of the video degraded by the turbulence (atmospheric fluctuation) disclosed in Zhu et al. is performed using a non-rigid registration. The non-rigid registration is based on a simple atmospheric turbulence degradation (or correction) model often used in the image processing field. Briefly, first, control points of the image are roughly set to the original image to be degraded by the atmospheric turbulence. Next, a vector (deformation vector) representing a deformation amount to be applied to each control point is randomly determined by a normal random number so as to deform the control point. Briefly, when the large variance of the normal random numbers of the deformation vector is large significantly degrades the obtained image due to the atmospheric turbulence.

Next, the deformation amount caused by the atmospheric turbulence applied to each pixel in the original image is determined from the deformed control point according to the following expression (1).

$$\Delta x = A(x)p \quad (1)$$

$$A(x) = \begin{bmatrix} c_1 & \cdots & c_m & 0 & \cdots & 0 \\ 0 & \cdots & 0 & c_1 & \cdots & c_m \end{bmatrix}$$

$$c_i = \beta\left(\frac{x_c - x_i}{\varepsilon_x}\right)\left(\frac{y_c - y_i}{\varepsilon_y}\right) \text{ where } \beta(k) = \begin{cases} 2/3 - (1 - |k|/2)k^2 & 0 \le |k| \le 1 \\ (2 - |k|)^3/6 & 1 < |k| < 2 \\ 0 & \text{otherwise} \end{cases}$$

In the expression (1), $\Delta x$ is a deformation amount applied to each pixel in the original image, p is a deformation amount (deformation vector) applied to the control point, $A(x)$ is a matrix for converting p into $\Delta x$, and $\varepsilon x$ and $\varepsilon y$ are distances between control points in the x and y directions. $(x_c, y_c)$ is a coordinate of an arbitrary control point, and $(x_i, y_i)$ is a coordinate of the i-th pixel in the original image. In short, the expression (1) is an expression for applying a smooth deformation to each pixel in the original image along the deformed control point.

Finally, a pixel value of each deformed pixel is determined by the interpolation from the original image, and the atmospheric turbulence degraded image is generated. This model is also called B-Spline. This model is applicable to an image degradation caused by the arbitrary turbulence regardless of the type of medium (atmosphere or water).

On the contrary, in the positional shift correction, the deformation vector is estimated by iterative calculations from the atmospheric turbulence degraded image and the reference image, and the deformation added to the atmospheric turbulence degraded image is corrected from the obtained deformation vector. The reference image is a reference image that can be considered to have no image degradation caused by the atmospheric turbulence, and is given, for example, by averaging a plurality of atmospheric turbulence degraded images. For more details, see Zhu et al.

In creating an atmospheric turbulence degraded video, the processing of adding the above atmospheric turbulence may be applied for each frame in the original video to which the atmospheric turbulence degradation is added. In this case, since there is no correlation between the atmospheric turbulence applied to frames, the obtained atmospheric turbulence degraded video is different from the actual video (actual atmospheric turbulence degraded video). However, the obtained atmospheric turbulence degraded video is qualitatively similar to the actual atmospheric turbulence degraded video. In addition, the method disclosed in Zhu et al. can successfully recover the image degradation caused by the real atmospheric turbulence. Thus, since the B-Spline based turbulence model is considered to be close to the reality, the present invention is also used to create a training video (training image sets) degraded by the turbulence for learning the CNN described later.

A blur that varies depending on the location of each frame can be corrected by selecting the sharpest target area (with the largest pixel value dispersion) for the fixed time (frame), by performing this selection for the entire image, and by connecting obtained areas together. This processing is called "lucky imaging." A blind deconvolution is performed by simultaneously estimating both a PSF (Point Spread Function) representing a blur caused by an atmospheric turbulence and a sharp image which the atmospheric turbulence degradation has been removed.

Figure 1:
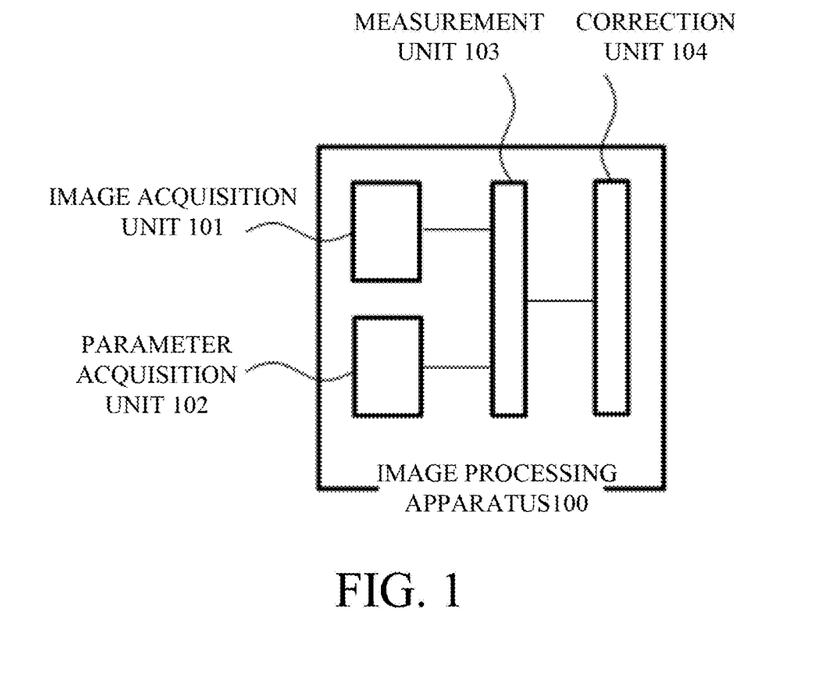
FIG. 1 is a block diagram of an image processing apparatus according to one embodiment.

Referring now to FIG. 1, a description of an image processing apparatus according to this embodiment will be given. FIG. 1 is a block diagram of an image processing apparatus 100. The image processing apparatus 100 includes an image acquisition unit 101, a parameter acquisition unit 102, a measurement unit 103, and a correction unit 104. The image acquisition unit 101 acquires a plurality of images (input images) captured by the imaging apparatus. The imaging apparatus can acquire digital video data, and is, for example, a digital video camera or a digital camera.

Frames of video are generally degraded. For example, in case of a digital camera, blurring due to an imaging optical system or an optical low-pass filter, noises due to an image sensor, a demosaicing error, noises due to a data compression, and the like can be cited as degradation factors. The video degradation process may be known. This is because a large amount of training image sets (frames of training video) for the CNN learning described later can be generated by numerical calculation. The format of the video data is not limited as long as it is readable by a computer, such as AVI (Audio Video Interleave) and MPEG (Moving Picture Experts Group). In this embodiment, the video may be colored or monochromatic, but for simplicity, assume that the video is a monochromatic video in the following description.

The image acquisition unit 101 acquires, as imaging conditions for a plurality of input images, an optical condition (focal length, F-number, etc.) of an optical system (imaging optical system) used for imaging, a pixel pitch in an image sensor used for imaging, or a frame rate. This is to coincide a CNN learning condition described later with the imaging condition (condition for acquiring the input image).

The parameter acquisition unit 102 acquires a learned network parameter. The network parameter includes filters and biases which are CNN parameters to be described later. Briefly, the CNN is a calculation using the learned parameter, and includes, for example, a PC (Personal Computer), a workstation, an FPGA (Field Programmable Gate Array), or a server. Hence, the parameter acquisition unit 102 includes, for example, a HDD (Hard Disk Drive) for a PC. Alternatively, the parameter acquisition unit 102 may acquire a storage medium storing the network parameter via an interface device such as a CD-ROM drive and a USB interface. In this case, the parameter acquisition unit 102 includes an interface device.

The learned network parameter is a network parameter generated in advance by learning for the CNN that constitutes the measurement unit 103 and the correction unit 104, which will be described later. The obtained parameter may be set by selecting a condition (imaging condition) for acquiring the input image provided from the image acquisition unit 101 which is close to a network parameter learning condition. Herein, the learning condition is the imaging condition (such as the optical condition of the optical system, the pixel pitch, and the frame rate) used to numerically generate (or acquire) training image sets used for the CNN learning described later.

A brief description of the CNN will be given below. The CNN is a learning-based image processing technology in which a filter generated by training or learning is convolved with an image and then a nonlinear operation is repeatedly performed. An image (or images) obtained by the nonlinear transformation after the filter is convolved with the image is called a feature map. Learning is performed using training image sets (training images or data sets) including a pair of an input image and an output image. Briefly, learning is to generate a filter value that can convert the input image into the corresponding output image with high accuracy, based on the training image sets. Details will be described later.

When the image has RGB color channels, or when it has a plurality of images (frames of video), or when the feature map has a plurality of images, the filter used for the convolution includes a plurality of channels accordingly. In other words, the convolution filter is represented by a four-dimensional array including height and width sizes of the image, the number of images, and the number of channels. The processing of the nonlinear calculation after convolving the filter with the image (or feature map) is expressed in units of layers. For example, it is called an m-th layer feature map or an n-th layer filter. For example, a CNN that repeats the filter convolution and nonlinear calculation three times is called a three-layer network structure. This processing can be expressed as the following expression (2).

$$X_n^{(l)} = f\left(\sum_{k=1}^{K} W_n^{(l)} * X_{n-1}^{(k)} + b_n^{(l)}\right) \quad (2)$$

In the expression (2), $W_n$ is an n-th layer filter, $b_n$ is an n-th layer bias, f is a nonlinear operator, $X_n$ is an n-th layer feature map, and * is a convolution operator. (l) on the right shoulder represents the l-th filter or feature map. The filters and the biases are generated by learning described later, and are collectively referred to as network parameters. A sigmoid function and ReLU (Rectified Linear Unit) are often used as a nonlinear operation.

Next follows a description of the CNN learning. The CNN learning is performed by minimizing the objective function (loss function). Loss function is illustratively expressed by the following expression (3) for a training image (training image sets) that includes a set of an input training image (such as a degraded image) and a corresponding output training image (such as a sharp ground truth image).

$$L(\theta) = \frac{1}{n}\sum_{i=1}^{n} \|F(X_i; \theta) - Y_i\|_2^2 \quad (3)$$

In the expression (3), L is a loss function that measures an error between the ground truth and its estimation. $Y_i$ is an i-th output training image, and $X_i$ is an i-th input training image. F is a function that collectively represents the calculation (expression (2)) performed in each layer of the CNN. $\theta$ is a network parameter (filters and biases). $\|Z\|_2$ is an L2 norm, which is simply a square root of the sum of squares of elements in a vector Z.

Input and output images having a known relationship are used for the training image. For example, a sharp output image and an input image degraded by adding a blur caused by an optical system to the sharp output image. When the output of the CNN is not an image but a scalar (value), the loss function is similarly defined and a network parameter may be determined. In that case, the training image is an output value corresponding to the input image. A CNN that outputs a scalar is a special type called a fully connected neural network, and will be described in detail later.

In the expression (3), n is the total number of training images used for the learning, but generally the total number of training images is large (such as tens of thousands), so the stochastic gradient descendant (SGD) selects part of the training images at random and use it for learning. Thereby, the calculation load in the learning using many training images can be lessened.

A variety of methods, such as a momentum method, AdaGrad, AdaDelta, and Adam, are known as methods for minimizing (or optimizing) the objective function. However, there is currently no guideline for selecting an optimization method in the learning. Thus, basically any method may be used, but there is known a learning time difference because these optimization methods has different convergences.

Using the network parameters and CNN learned by the above procedure can provide image processing that converts a degraded image into a sharp image with high accuracy, for example. This image processing is also referred to as deep learning.

The measurement unit 103 measures and outputs the turbulence strength from the input images (a plurality of images, or frames of video) using the learned network parameter and the CNN. The measurement unit 103 is the above CNN, and includes, for example, a PC, a workstation, an FPGA, and a server. However, the measurement unit 103 is not limited to these examples, and may use any computers that can implement the above CNN calculation. The turbulence strength is a scalar representing the turbulence strength or intensity of the input image, and specifically, is a temporal or spatial dispersion degree of pixel values of the input image. Herein, the dispersion degree is a statistic including the variance and standard deviation. For example, when the B-Spline is used as the turbulence model, the above variance of the deformation vector may be used for the turbulence strength. As described above, one of the characteristics of the present invention is that the turbulence strength of the input image is expressed by a scalar called the temporal or spatial dispersion degree of the pixel values.

As described above, the output of the CNN is an image. Thereby, in order to output the turbulence strength as scalar, a fully connected neural network that converts the image that is the output of the CNN into the scalar may be added to the output unit. The fully connected neural network can be formulated as the following expression (4).

$$X_n = f(W_n X_{n-1} + b_n) \quad (4)$$

In the expression (4), $X_n$ is a vector representing an n-th layer feature map, and $W_n$ is a matrix representing a weight added to each element in $X_{n-1}$. Thereby, it is necessary to convert an image output from the CNN into a vector and then to input it into a fully connected neural network. For example, a 50×50 pixel image is converted into a 2500-dimensional vector. The image size that can be input into the fully connected neural network is defined by the size of the fully connected neural network. It is thus necessary to adjust the size of the input image into the CNN so that an output image that can be input into the fully connected neural network can be obtained.

Even the CNN to which the fully connected neural network is added can be learned by the above method. This is because historically the fully connected neural network were studied first and the CNN was later studied as its derivative, but details thereof will be omitted. The measurement unit 103 includes the CNN and the fully connected neural network added to the output unit, but will be simply referred to as the "CNN of the measurement unit 103" or the like.

The training image (training image sets) including a set of an input training image and the turbulence strength is used to learn the CNN network parameters of the measurement unit 103. It is generally difficult to obtain an input training image that has degraded at a known turbulence strength. Therefore, for example, the turbulence model B-Spline described above may be used for a numerical generation. In this case, the variance of the deformation vector can be used for the turbulence strength. For example, the network parameter is generated by learning with a training image sets (training video) that includes a set of a plurality of first image sets (first video) that are temporally different from each other, and a plurality of second image sets (second video) that are the plurality of first image sets degraded by a known turbulence strength. A plurality of images that are "temporally different" includes a plurality of images acquired at different times.

Using an input training image that includes a moving object for a training image enables the turbulence strength that is robust (accurate) to the moving object to be measured. Similarly, if the video degradation processing of the image acquisition unit 101 is known, the input training image including the degradation is generated by a numerical calculation and used as a training image, so that the turbulence strength can be measured that is robust (accurate) to the degradation.

Normalization

The measurement unit 103 normalizes the input image or the input training image. The purpose of this normalization is to prevent the measurement result from being influenced by the absolute value of the pixel value in the input image. The normalization is performed, for example, by generating an average image of a plurality of input images and subtracting the average image from each of the plurality of input images. This normalization method can be formulated as the following expression (5).

$$\bar{I}_i = I_i - \frac{1}{m}\sum_{i=1}^{m} I_i \quad (5)$$

In the expression (5), $I_i$ is an i-th input image, and m is the number of input images. A bar (-) added on $I_i$ indicates that it has been normalized.

The normalization can be performed, for example, by generating a differential image between two images that are temporally adjacent from a plurality of input images. This normalization method can be formulated by the following expression (6).

$$\bar{I}_i = I_{i+1} - I_i \text{ where } i=1 \sim m-1 \quad (6)$$

The meaning of the symbols used in the expression (6) is similar to the expression (5). The normalization method is appropriately selected in accordance with the definition of the turbulence strength, the input image, the measurement accuracy of the turbulence strength, and the like. This embodiment uses the normalization method basically given by the expression (5). Thus, this embodiment may measure the turbulence strength using the normalized input image. Thereby, since the influence of the absolute value of the pixel value in the input image can be removed, a highly accurate measurement result can be obtained.

Input Image Size Adjustment

The height and width size of the image input into the measurement unit 103 is determined by the fully connected neural network added to the output unit of the network. It is thus necessary to adjust the height and width size of each of the input image and the input training image by trimming, interpolating, or thinning them.

The number of images (frames of video) input into the measurement unit 103 is determined according to the number of frames of the input training image. Hence, the input image needs to be input to the measurement unit 103 after being temporally interpolated or thinned. For example, when an input image is acquired at a high frame rate, an input image thinned to match the frame rate of the input training image is input into the measurement unit 103. This is because the measurement result is not influenced by the frame rate difference between the input image and the input training image. The condition for acquiring the input image may be acquired from the image acquisition unit 101, and the number of frames of the input training image may be acquired from the parameter acquisition unit 102.

As described above, this embodiment may measure the turbulence strength using the input image having the adjusted image size (particularly frame rate). Thereby, since the influence of the frame rate difference between the input image and the input training image can be removed, a highly accurate measurement result can be obtained.

Measurements at Plurality of Locations

The measurement unit 103 may measure the turbulence strengths at a plurality of locations in the input image and determine the final turbulence strength. Herein, the plurality of locations in the input image mean a plurality of spatial and temporal (height, width, frame) locations of the input image. More specifically, images having a predetermined height and width size and a predetermined number of frames are extracted from spatial and temporal directions of the input image by the above described method, and are input as input images into the measurement unit 103 and the turbulence strength may be measured.

For example, an average value may be calculated as the final turbulence strength from the turbulence strengths measured at a plurality of locations in the input image. An intermediate value, a minimum value, a maximum value, or a mode may be acquired from the turbulence strengths measured at a plurality of locations, and may be set to the final turbulence strength. This is to prevent the measurement result from being locally influenced by a location where the input image is degraded due to the turbulence.

Thus, this embodiment may measure the turbulence strengths at a plurality of locations in the input image to determine the final turbulence strength. Thereby, even if the input image is locally degraded due to the turbulence, a highly accurate measurement result can be obtained.

The correction unit 104 corrects the degradation of the input image caused by the turbulence based on the measured turbulence strength. Herein, the correction method is not limited, and may use the above CNN from the viewpoint of the image processing accuracy. Hence, the following description assumes that the correction unit 104 is the CNN. The correction unit 104 is the above CNN, which includes, for example, a PC, a workstation, an FPGA, and a server. However, the correction unit 104 is not limited to these examples as long as any computers can realize the above CNN calculation. The correction unit 104 performs correction processing using the learned network parameter provided by the parameter acquisition unit 102. In addition, for learning of the CNN network parameter of the correction unit 104, a training image including a set of an input training image obtained by adding a known turbulence strength degradation to the output training image and the output training image. It is generally difficult to obtain such a training image. Thus, for example, the training image may be numerically generated using the above turbulence model B-Spline. In this case, the variance of the above deformation vector can be used as the turbulence strength.

The turbulence can be corrected robustly for the moving object by using the input and output training images including the moving object for the training image. Similarly, if the video degradation processing of the image acquisition unit 101 is known, the input training image including the degradation can be generated by the numerical calculation and used as the training image, so that the degradation caused by the turbulence can be corrected robustly for the video degradation.

Network Parameter Selection

The correction unit 104 selects a learned network parameter provided by the parameter acquisition unit 102 based on the measured turbulence strength, and performs correction processing. This is to perform a highly accurate turbulence correction using a network parameter learned from a training image having the same turbulence strength as that of the input image. For example, a network parameter learned from a training image having a degradation caused by the turbulence strength closest to the measured turbulence strength may be selected and used for the correction processing. Thus, a highly accurate turbulence correction can be performed by selecting a learned network parameter based on the measured turbulence strength.

Number of Frames

The correction unit 104 determines the number of input images (number of frames) based on the measured turbulence strength. This is because if the turbulence is large, a large number of input images are required for the correction, and conversely, if the turbulence is small, a large number of input images are not required for the correction. When the CNN network parameter of the correction unit 104 is learned, the number of input training images is adjusted based on the turbulence strengths applied to the training images. More specifically, for the learning, the number of input training images may be made larger if the turbulence is large, and the number of input training images may be made smaller if the turbulence is small. Thus, data necessary for the correction can be determined by determining the number of input images (number of frames) based on the measured turbulence strength.

The output image, which is an image processing result obtained by the correction unit 104, can be stored in an unillustrated memory provided in the image processing apparatus 100. The output image may be displayed on an unillustrated display unit provided outside the image processing apparatus 100. Alternatively, the output image may be stored in an unillustrated storage medium outside the image processing apparatus 100 via an unillustrated interface device such as a CD-ROM drive or a USB interface. A description will be omitted of wiring and radio communications for communicating information (data) among the image acquisition unit 101, the parameter acquisition unit 102, the measurement unit 103, and the correction unit 104.

The functions of the image processing apparatus 100 may be realized on a computer by causing the computer to execute a program describing the functions of the image acquisition unit 101, the parameter acquisition unit 102, the measurement unit 103, and the correction unit 104. Similarly, a program describing at least one of the functions of the measurement unit 103 and the correction unit 104 may be installed in the VLSI as an electronic circuit to realize a partial function of the image processing apparatus 100.

Figure 2:
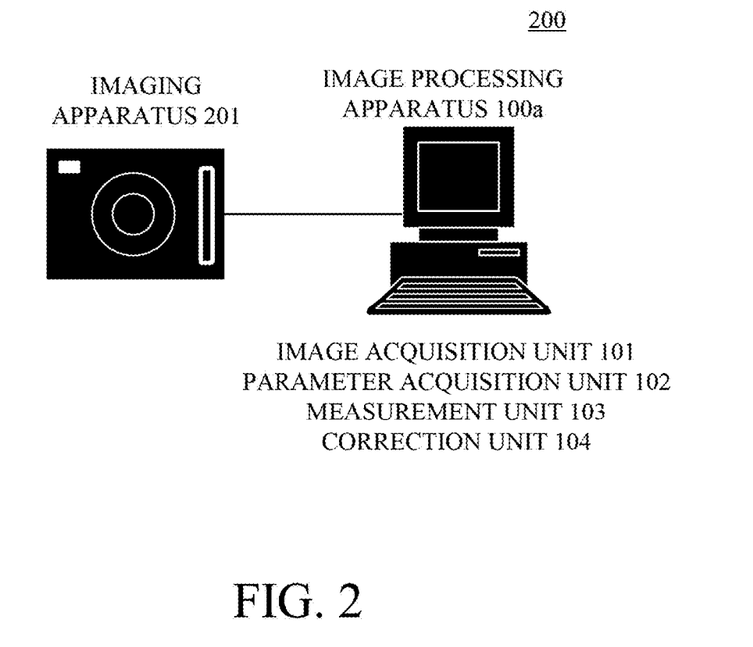
FIG. 2 is a configuration diagram of an image processing system according to this embodiment.

Referring now to FIG. 2, a description of the image processing system according to this embodiment will be given. FIG. 2 is a configuration diagram of an image processing system 200. The image processing system 200 includes an image processing apparatus 100a and an imaging apparatus (digital camera) 201. The imaging apparatus 201 has an imaging optical system and an image sensor, and acquires a captured image. The captured image acquired by the imaging apparatus 201 is output to the image processing apparatus 100a. The image processing apparatus 100a includes a PC and a display unit. The PC includes the image acquisition unit 101, the parameter acquisition unit 102, the measurement unit 103, and the correction unit 104. The display unit displays an output image as an image processing result.

Figure 3:
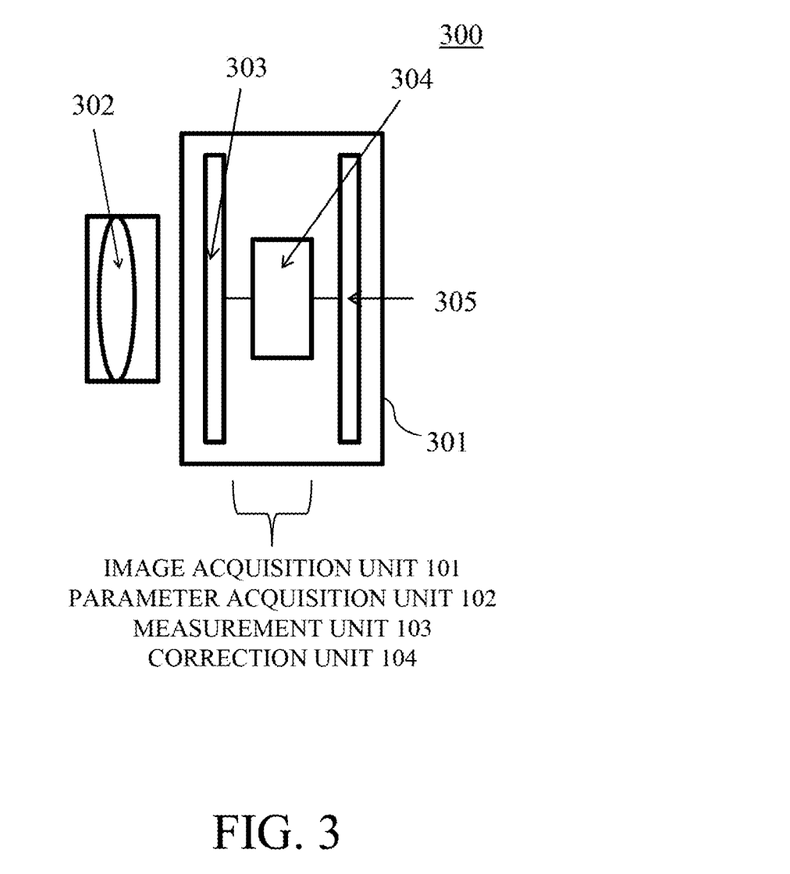
FIG. 3 is a configuration diagram of an imaging apparatus according to this embodiment.

Referring now to FIG. 3, a description of the imaging apparatus according to this embodiment will be given. FIG. 3 is a configuration diagram of an imaging apparatus 300. The imaging apparatus 300 includes a camera body 301 and a lens apparatus (interchangeable lens) 302. The camera body 301 includes an image sensor 303, an image processing engine (image processing apparatus) 304, and a monitor 305. The image processing engine 304 includes the image acquisition unit 101, the parameter acquisition unit 102, the measurement unit 103, and the correction unit 104. A display unit 305 displays an output image as an image processing result.

Figure 4:
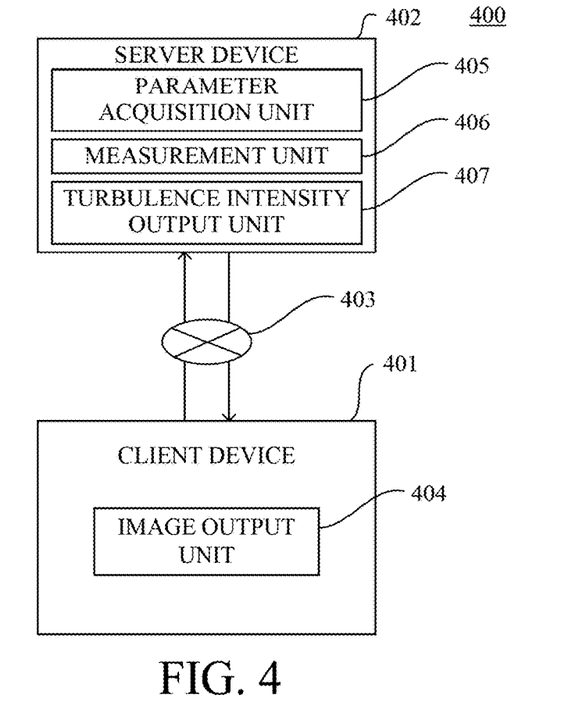
FIG. 4 is a block diagram of an image processing system according to this embodiment.

Referring now to FIG. 4, a description of another image processing system according to this embodiment will be given. FIG. 4 is a block diagram of an image processing system 400. The image processing system 400 includes a client device 401 and a server device 402 connected to the client device 401 via a network 403. The client device 401 has an image output unit 404. The image output unit 404 outputs to the server device 402 a plurality of temporally different images that have degraded due to the turbulence. The server device 402 includes a parameter acquisition unit 405, a measurement unit 406, and a turbulence strength output unit 407. The parameter acquisition unit 405 acquires a learned network parameter. The measurement unit 406 measures the turbulence strength from a plurality of images using the network parameter and neural network. The turbulence strength output unit 407 outputs the turbulence strength to the client device 401. The client device 401 or the server device 402 may include a correction unit (not shown) that corrects a plurality of images based on the turbulence strength.

Figure 5:
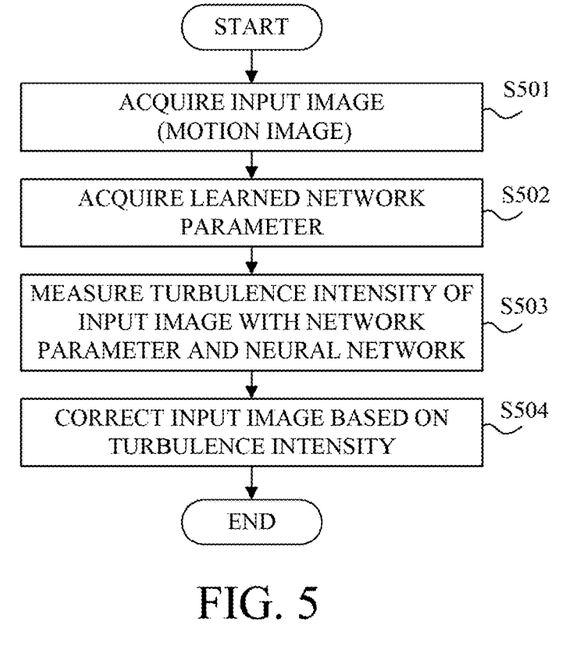
FIG. 5 is a flowchart of an image processing method according to this embodiment.

Referring now to FIG. 5, a description of an image processing method according to this embodiment will be given. FIG. 5 is a flowchart of the image processing method, and illustrates a program flow when the image processing method is executed by the VLSI or the like. Each step in FIG. 5 is executed by the image acquisition unit 101, the parameter acquisition unit 102, the measurement unit 103, and the correction unit 104 in the image processing apparatus 100, for example.

First, in the step S501, the image acquisition unit 101 acquires a plurality of temporally different images (input images, frames of video) that are degraded due to the turbulence. In the step S502, the parameter acquisition unit 102 acquires the learned network parameter. Next, in the step S503, the measurement unit 103 measures the turbulence strength from a plurality of images using the network parameter and the neural network. Finally, in the step S504, the correction unit 104 corrects a plurality of images based on the turbulence strength.

Next follows a detailed description of each example.

EXAMPLE 1

Figure 6:
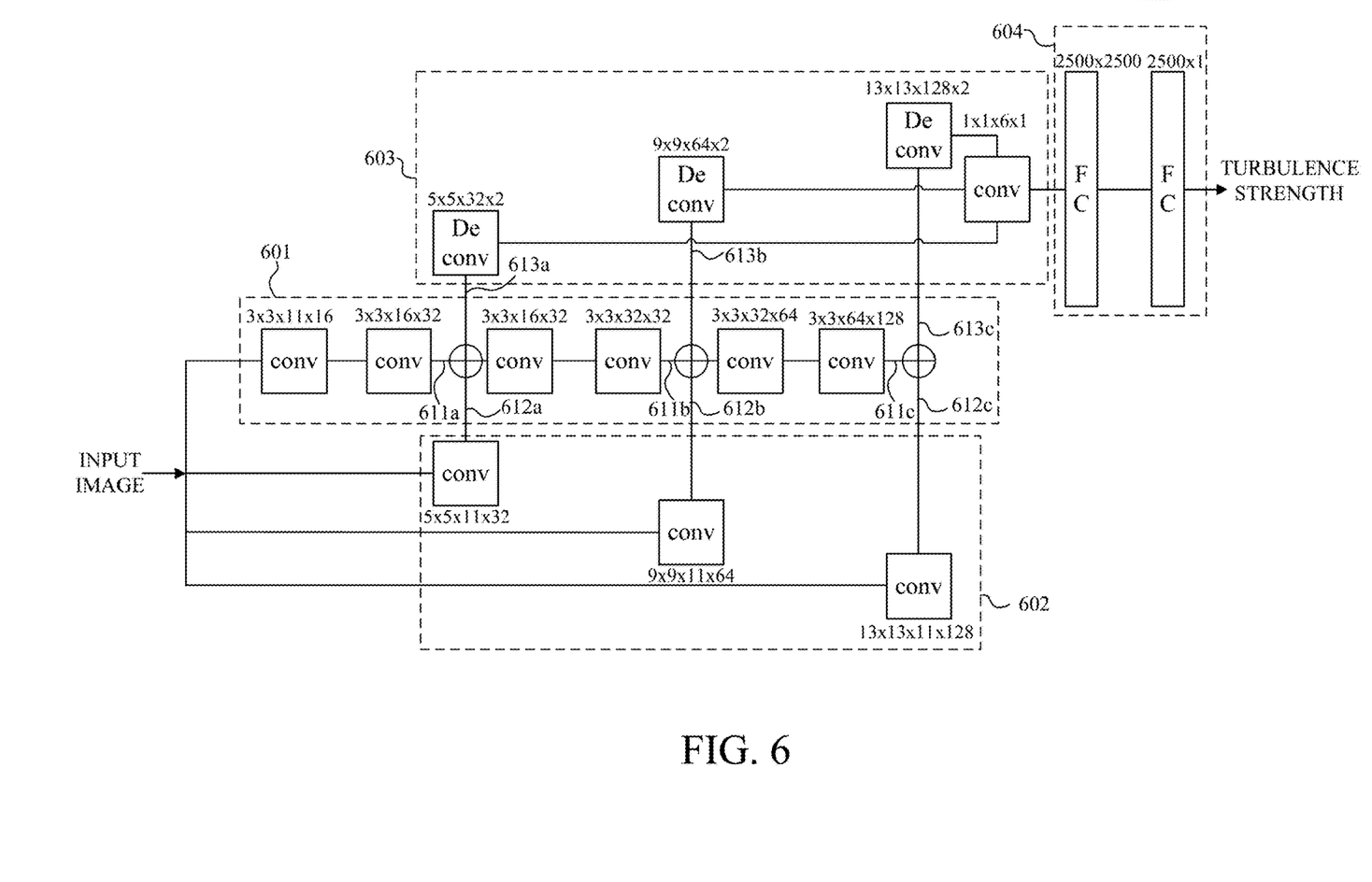
FIG. 6 illustrates a network structure according to Example 1.
Figure 7:
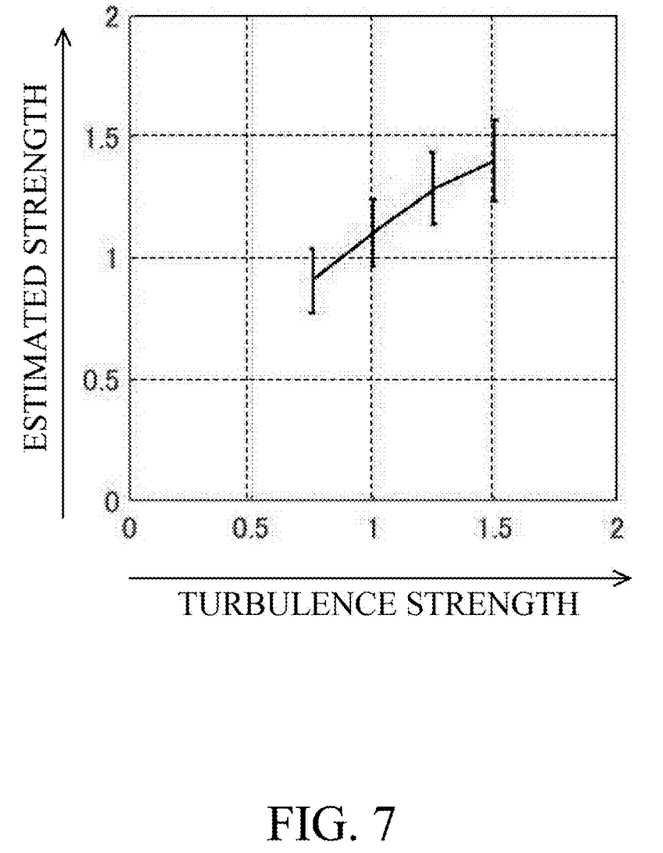
FIG. 7 illustrates a numerical calculation result according to Example 1.

Referring now to FIGS. 6 and 7, a description of Example 1 according to the present invention will be given. This example will describe a numerical calculation result obtained by measuring a turbulence strength of an input image degraded by the known turbulence strength using a program describing the function of the image processing apparatus 100.

FIG. 6 illustrates a network structure (CNN of the measurement unit 103) 600 according to this example. In FIG. 6, "conv" denotes a convolution layer, and "deconv" indicates a deconvolution (transposition convolution) layer. A numeric string above each layer represents the height and width sizes, the number of channels, and the number of filters. For example, "3×3×1×8" in FIG. 6 indicates that a convolution or deconvolution (transposition convolution) is performed with a filter having height and width sizes of 3×3, the number of frames of 1, and the number of channels of 8. The deconvolution (transposition convolution) is a type of convolution, and is simply inverse processing of the convolution. Details are disclosed in, for example, Xia-Jiao Mao, Chunhua Shen, Yu-Bin Yang, "Image restoration using convolutional auto-encoders with symmetric skip connections," arXiv:1606.08921, 2016 (Mao et al.). A cross mark in a circle in FIG. 6 represents the sum for each element of the feature map.

FC of the output unit in a network structure 600 denotes a fully connected network. The numeric string above the fully connected network represents the input size and output sizes to the fully connected network. For example, "2500× 2500" in FIG. 6 indicates that a 2500-dimensional vector is input and a 2500-dimensional vector is output. More specifically, a 50×50 pixel image output from the CNN is converted into a 2500-dimensional vector and input into the fully connected network. As described above, the image size that can be input into the fully connected network is determined. The input image size is determined accordingly. In this embodiment, the input image size is 50×50 pixels and 11 frames.

The network structure 600 shown in FIG. 6 is merely illustrative, and the present invention is not limited to this example. The training image includes a set of an input training image having a known turbulence strength and the turbulence strength. The input training image size is 50×50 pixels and 11 frames in accordance with the network structure 600 of the measurement unit 103. The input training image is numerically generated using the above turbulence model B-Spline. At this time, the variance of the deformation vector described above is used for the turbulence strength. An input training image including a moving object is used as the training image, so as to indicate, as described above, that the present invention can measure the turbulence strength robustly for a moving object.

The input image uses an image that can be considered to be acquired under the same condition as that of the training input image (such as the optical condition of the optical system, the pixel pitch in the image sensor, and the frame rate). Thus, no adjustment is made for the frame rate of the input image. The input image size is 400×400 pixels and 40 frames. Among them, 20 locations of 50×50 pixels and 11 frames are temporally and spatially extracted at random, and an average value of the calculated turbulence strength is set to the final turbulence strength. An input image including a moving object (car) was used.

The normalization of the input image and the input training image uses the method given by the expression (5). In other words, the normalization is made by generating an average image of a plurality of input (training) images and by subtracting it from each of the plurality of input (training) images. All images are monochrome images, and the pixel values are normalized in a range of [0 1].

Learning is SGD (Mao et al.) using the Adam method as an optimization method. The parameter of the Adam method is $\alpha=10^{-4}$, $\beta_1=0.9$, $\beta_2=0.999$, and $\varepsilon=10^{-8}$. The SGD is used by randomly selecting 128 images from the total number of training images of 76,800. The number of learning iterations is $18\times10^4$ times (300 epochs). The initial value of the network parameter (filters and biases) uses Xavier in all layers (Xavier Glorot, Yoshua Bengio, "Understanding the difficulty of training deep feedforward neural networks," Proceedings of the 13th International Conference on Artificial Intelligence and Statistics, 2010, pp. 249-256 (Glorot et al.)).

The size of image, the number of frames, and the normalization method of each of the input image and the input training image input into the measurement unit 103 are illustrative, and the present invention is not limited to this example. The definition of the turbulence strength output from the measurement unit 103 and the final calculation method of the turbulence strength are illustrative, and the present invention is not limited to this example.

As illustrated in FIG. 6, the network structure (neural network) 600 includes a main unit 601, an input unit 602, a conversion unit 603, and an output unit 604. The main unit 601 converts a plurality of images into first features 611a, 611b, and 611c using a first network parameter and a first convolution neural network (CNN) having at least two layers. The input unit 602 converts the plurality of images into second features 612a, 612b, and 612c by using a second network parameter and a second CNN. The conversion unit 603 adds the first features and the second features to generate third features 613a, 613b, and 613c, and converts the third features into fourth features 614 using a third network parameter and a third CNN. The output unit 604 outputs the turbulence strength based on the fourth features using a fourth network parameter and the fully connected neural network.

FIG. 7 shows a numerical calculation result (turbulence strength measurement result) according to this example. In FIG. 7, the horizontal axis represents the turbulence strength (true turbulence strength) given to the input image, and the vertical axis represents the turbulence strength measured from the input image. The error bar in the graph represents the standard deviation of the measured turbulence strength at 20 locations, which are randomly extracted from the input image. Thereby, it can be understood that the turbulence strength measurement is highly correlated with the turbulence strength given to the input image and is robust to the moving object.

EXAMPLE 2

Figure 8:
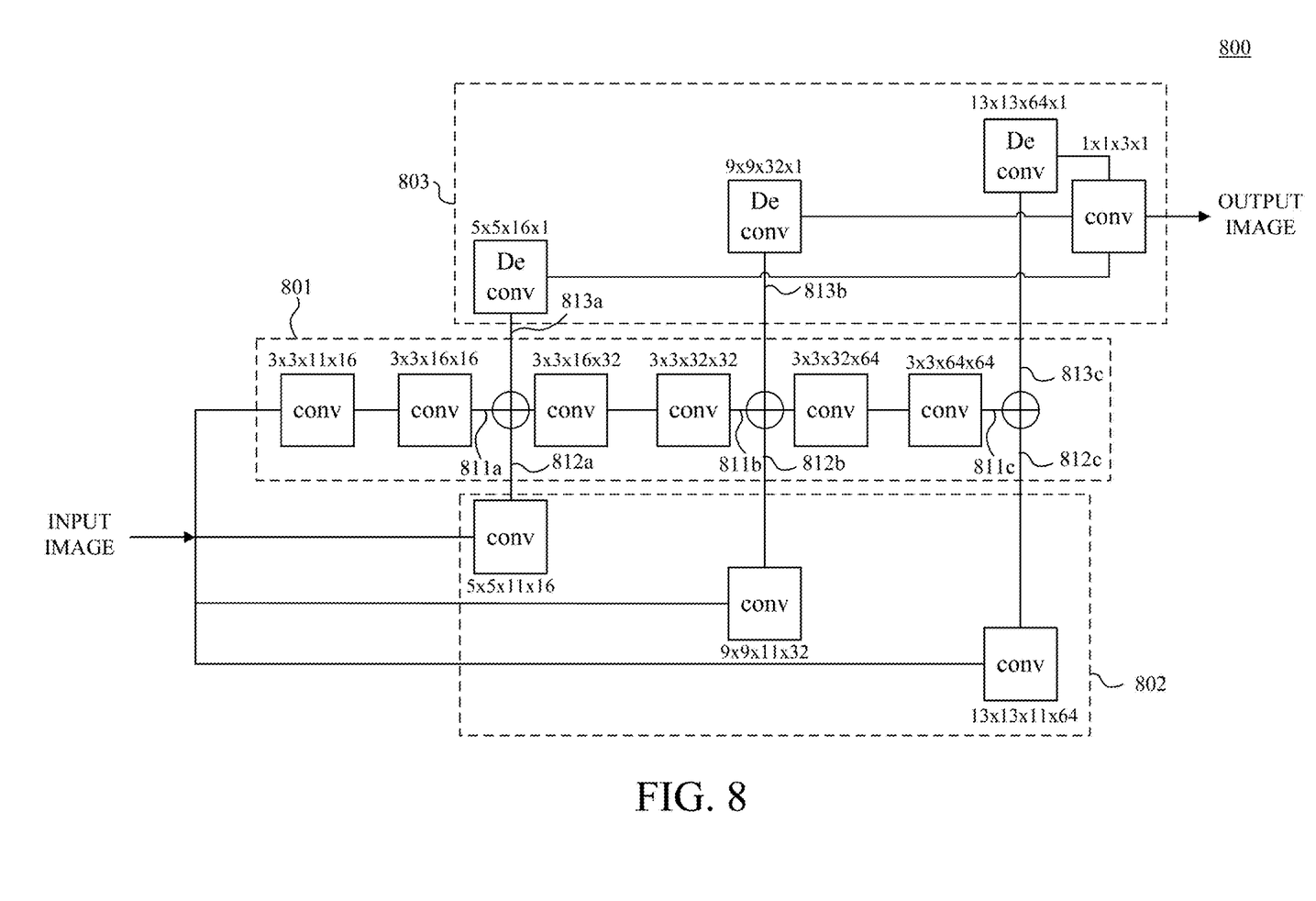
FIG. 8 illustrates a network structure according to Example 2.
Figure 9A:
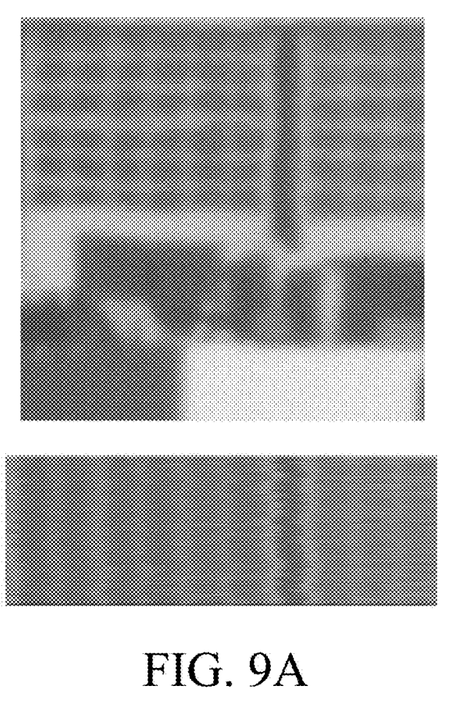
FIGS. 9A and 9B qualitatively illustrate numerical calculation results according to Example 2.
Figure 9B:
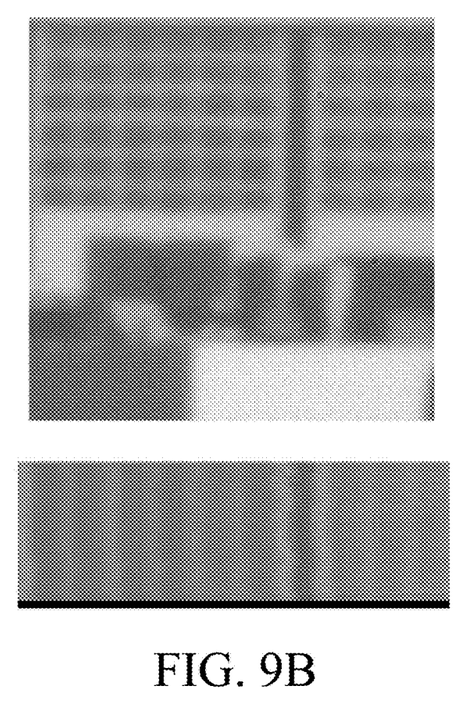
Figure 10:
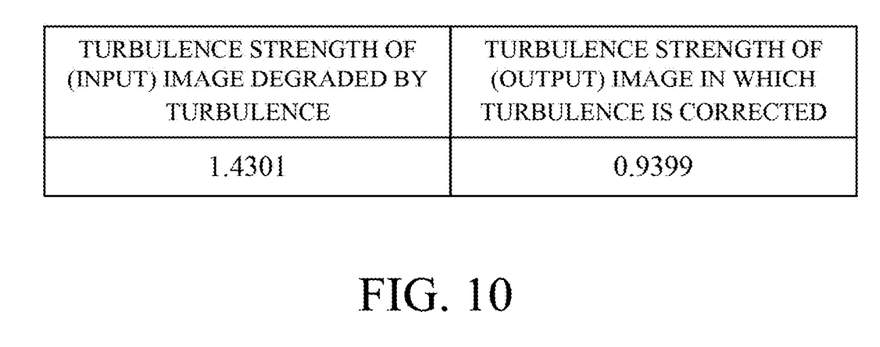
FIG. 10 quantitatively illustrates the numerical calculation results according to Example 2.

Referring now to FIGS. 8 to 10, a description of Example 2 according to the present invention will be given. This example will describe a numerical calculation result with a turbulence corrected after measuring a turbulence strength of an input image having an unknown turbulence strength, using a program describing the function of the image processing apparatus 100. The CNN of the measurement unit 103 is the same as that of Example 1, and thus a description thereof will be omitted.

FIG. 8 illustrates a network structure (CNN of the correction unit 104) 800 according to this embodiment. The basic configuration of the network structure 800 in FIG. 8 is the same as that of the network structure 600 in the measurement unit 103 described in the Example 1 except that there is no fully connected network in the output unit, and thus a detailed description thereof will be omitted.

The network structure 800 includes a main unit 801, an input unit 802, and an output unit 803. The main unit 801 converts the plurality of images into fifth features 811a, 811b, and 811c using a learned fifth network parameter and a fifth convolutional neural network (CNN) having at least two layers. The input unit 802 converts the plurality of images into sixth features 812a, 812b, and 812c using a learned sixth network parameter and a sixth CNN. The output unit 803 adds the fifth features and the sixth features to generate seventh features 813a, 813b, and 813c, and converts seventh features into an output image using a learned seventh network parameter and a seventh CNN. The network structure 800 illustrated in FIG. 8 is merely illustrative, and the present invention is not limited to this example.

The training image includes a set of input training images obtained by adding degradation caused by the known turbulence strength to the output training images. The input training image is numerically generated from the output training image using the above turbulence model B-Spline. At that time, the variance of the deformation vector described above is used for the turbulence strength. Since the network structure 800 does not have a fully connected network at its output unit, the training images of any sizes can be used. In this embodiment, similar to Example 1, the input and output training images have 50×50 pixels. The number of input training images (the number of frames) can be determined according to the turbulence strength. In this example, the number of frames is 11 regardless of the turbulence strength.

The input image is an image that can be considered to be acquired under the same condition as that of the training input image (such as the optical condition of the optical system, pixel pitch in the image sensor, and the frame rate). Hence, no frame rate is adjusted. The input image has 400×400 pixels and 80 frames. The output image size is the same as the input image size. All images are monochrome images, and the pixel values are normalized in a range of [0 1].

Learning is SGD using the Adam method as an optimization method, as described above. The parameter of the Adam method includes $\alpha=10^{-4}$, $\beta_1=0.9$, $\beta_2=0.999$, and $\varepsilon=10^{-8}$. SGD is used by randomly selecting 128 images from 76,800 training images. The number of learning iterations is $18\times10^4$ (300 epochs). The initial value of the network parameters (filter and bias) uses Xavier in all layers (Glorot et al.). The size and the number of frames of each of the input image and the input training image input to the measurement unit 103 are illustrative, and the present invention is not limited to this example. The size and the number of frames of each of the output image and the output training image output from the measurement unit 103 are illustrative, and the present invention is not limited to this example.

FIGS. 9A and 9B qualitatively show numerical calculation results according to this example, and indicates turbulence correction results. FIG. 9A shows one frame of an image (input image) degraded by the turbulence, and FIG. 9B shows one corresponding frame of the turbulence corrected output image. For easy understanding, one section of each diagram temporally stacked in the time direction is also shown below each diagram. Thereby, it can be qualitatively understood that the turbulence is appropriately corrected since the cross-sectional view shows that image degradation by the turbulence is suppressed.

FIG. 10 quantitatively shows a numerical calculation result according to this example, and indicates measurement results according to this example of turbulence strengths of an image (input image) degraded by the turbulence and an image (output image) having a corrected turbulence. The method described in Example 1 is used to measure the turbulence strength. Since the turbulence strength of the output image is smaller than that of the input image, it can be quantitatively understood that the turbulence is appropriately corrected.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Each embodiment can provide an image processing apparatus, an image processing system, an imaging apparatus, an image processing method, and a storage medium, each of which can measure the intensity of turbulence with high accuracy.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-219876, filed on Nov. 26, 2018, which is hereby incorporated by reference herein in its entirety.

What is claimed is:

1. An image processing apparatus comprising:
   an image acquisition unit configured to acquire a plurality of temporally different images each of which has degraded by a turbulence;
   a parameter acquisition unit configured to acquire a learned network parameter; and
   a measurement unit configured to measure a turbulence strength from the plurality of images using the network parameter and a neural network,
   wherein the measurement unit normalizes the plurality of images by generating an average image of the plurality of images and subtracting the average image from each of the plurality of images, and inputs the plurality of normalized images to the neural network,
   wherein the turbulence strength is a temporal or spatial dispersion degree of pixel values of each of the plurality of normalized images, and is output by the neural network, and
   wherein the network parameter is learned using a plurality of first image sets that are temporally different from each other and a plurality of second image sets that are the plurality of first image sets degraded by a known turbulence strength.

2. The image processing apparatus according to claim 1, wherein the image acquisition unit acquires an imaging condition for the plurality of images.

3. The image processing apparatus according to claim 2, wherein the imaging condition includes at least one of an optical condition for an optical system used for imaging, a pixel pitch in an image sensor used for imaging, and a frame rate.

4. The image processing apparatus according to claim 1, wherein the parameter acquisition unit determines the network parameter to be acquired based on imaging conditions of the plurality of images.

5. The image processing apparatus according to claim 1, wherein the neural network includes:
   a main unit configured to convert the plurality of images into first features using a first network parameter and a first convolutional neural network (CNN) having at least two layers;
   an input unit configured to convert the plurality of images into second features using a second network parameter and a second CNN;
   a conversion unit configured to generate a third feature value by adding the first features and the second features to each other, and to convert the third features into fourth features using a third network parameter and a third CNN; and
   an output unit configured to output the turbulence strength from the fourth features using a fourth network parameter and a fully connected neural network.

6. The image processing apparatus according to claim 1, wherein the measurement unit determines sizes of the plurality of images to be used for a measurement based on imaging conditions of the plurality of images.

7. The image processing apparatus according to claim 1, wherein the measurement unit adjusts sizes of the plurality of images by temporally or spatially interpolating or thinning the plurality of images.

8. The image processing apparatus according to claim 1, wherein the measurement unit generates a difference image between two temporally adjacent images from the plurality of images.

9. The image processing apparatus according to claim 1, wherein the measurement unit measures the turbulence strength at a plurality of locations of the plurality of images, and determines a final turbulence strength.

10. The image processing apparatus according to claim 1, wherein the turbulence strength is a variance of normal random numbers of a deformation amount applied as random numbers to control points in an image in a B-Spline based turbulence model.

11. The image processing apparatus according to claim 1, further comprising a correction unit configured to correct the plurality of images based on the turbulence strength.

12. An image processing apparatus according to claim 11, wherein the correction unit includes:
   a main unit configured to convert the plurality of images into fifth features using a learned fifth network parameter and a fifth convolutional neural network (CNN) having at least two layers;
   an input unit for converting the plurality of images into sixth features using a learned sixth network parameter and a sixth CNN; and
   an output unit configured to generate seventh features by adding the fifth features and the sixth features to each other, and to convert the seventh features into an output image using a learned seventh network parameter and a seventh CNN.

13. The image processing apparatus according to claim 11, wherein the correction unit determines the number of the plurality of images used for a correction based on the turbulence strength measured by the measurement unit.

14. An image processing system comprising:
   a client device; and
   a server device connected to the client device,
   wherein the client device includes an image output unit configured to output to the server device a plurality of temporally different images degraded by a turbulence,
   wherein the server device includes:
      a parameter acquisition unit configured to acquire a learned network parameter;
      a measurement unit configured to measure a turbulence strength from the plurality of images using the network parameter and a neural network; and
      a turbulence strength output unit for outputting the turbulence strength to the client device,
   wherein the measurement unit normalizes the plurality of images by generating an average image of the plurality of images and subtracting the average image from each of the plurality of images, and inputs the plurality of normalized images to the neural network, wherein the turbulence strength is a temporal or spatial dispersion degree of pixel values of each of the plurality of normalized images, and is output by the neural network, and wherein the network parameter is learned using a plurality of first image sets that are temporally different from each other and a plurality of second image sets that are the plurality of first image sets degraded by a known turbulence strength.

15. An imaging apparatus comprising:
an image sensor; and
the image processing apparatus according to claim 1.

16. An image processing method comprising:
an image acquisition step configured to acquire a plurality of temporally different images each of which has degraded by a turbulence;
a parameter acquisition step configured to acquire a learned network parameter; and
   a measurement step configured to measure a turbulence strength from the plurality of images using the network parameter and a neural network, wherein the measurement step normalizes the plurality of images by generating an average image of the plurality of images and subtracting the average image from each of the plurality of images, and inputs the plurality of normalized images to the neural network, wherein the turbulence strength is a temporal or spatial dispersion degree of pixel values of each of the plurality of normalized images, and is output by the neural network, and wherein the network parameter is learned using a plurality of first image sets that are temporally different from each other and a plurality of second image sets that are the plurality of first image sets degraded by a known turbulence strength.

17. A non-transitory computer-readable storage medium storing a program for causing a computer to execute the image processing method according to claim 16.

* * * * *